United States Patent

Krug et al.

[11] Patent Number: 4,725,410
[45] Date of Patent: Feb. 16, 1988

[54] METHOD AND APPARATUS FOR IMPROVED VAPOR RECOVERY FOR FLUIDIZED CATALYTIC CRACKING PROCESS

[75] Inventors: Russell R. Krug, San Rafael; Frederick A. Pettersen, Novato, both of Calif.

[73] Assignee: Chevron Research Company, San Francisco, Calif.

[21] Appl. No.: 840,860

[22] Filed: Mar. 18, 1986

Related U.S. Application Data

[60] Division of Ser. No. 692,443, Jan. 16, 1985, Pat. No. 4,591,427, which is a continuation-in-part of Ser. No. 444,328, Nov. 24, 1982, abandoned.

[51] Int. Cl.$^4$ .................................... B01J 8/18
[52] U.S. Cl. ................................ 422/147; 55/441; 422/144
[58] Field of Search ............... 422/144, 145, 147; 55/441

[56] References Cited

U.S. PATENT DOCUMENTS

| | | | |
|---|---|---|---|
| 3,826,738 | 7/1974 | Lenz | 208/153 |
| 4,310,489 | 1/1982 | Fahrig et al. | 422/147 |
| 4,394,349 | 7/1983 | Cartwell | 422/147 |

Primary Examiner—Barry S. Richman
Assistant Examiner—R. Johnson
Attorney, Agent, or Firm—Burns, Doane, Swecker & Mathis

[57] ABSTRACT

A vapor recovery shroud of relatively small size is positioned in a large diameter catalyst disengaging vessel of a fluid catalytic cracking system so that vapor released directly from the riser reactor pipe must execute a reversal of flow direction to enter the vapor recovery shroud which results in a fast, efficient separation of reactive hydrocarbons from spent catalyst. At the same time vapors from the stripper and catalyst are separated by gravity and inertia in the large diameter separation vessel so that stripper vapors also vent through the vapor recovery shroud. Vapor is vented from the vapor recovery shroud through cyclone means confined within the disengaging vessel. Preferably, the inlet to the vapor recovery shroud is located adjacent to the riser reactor outlet because this location is the most rarefied in catalyst density and provides the shortest path for hydrocarbon vapors to exit the hot separation vessel and enter a distillation system. Desirably, the vapor recovery shroud closely surrounds the primary vapor release point from the riser reactor pipe, so that essentially all the vapor must execute a 180° turn to enter the vapor recovery zone. Such a position produces the combined improvements of product yield (less gas and coke, more gasoline and light cycle oil) and product quality (less solid content and fractionator bottoms). These product improvements are respectively due to reduced residence time of hydrocarbon vapor with spent catalyst, which produces undesirable secondary cracking, and reduces catalyst entrainment and carryover with the hydrocarbon vapor, which adds solids to the product fluids.

12 Claims, 23 Drawing Figures

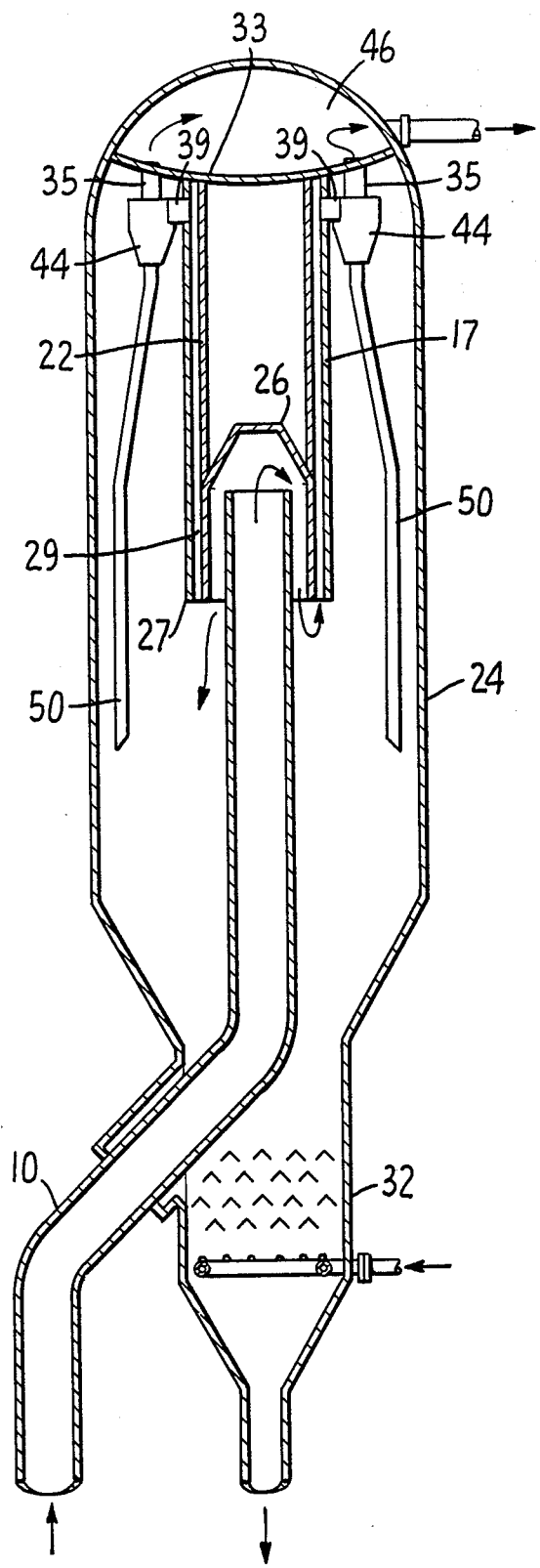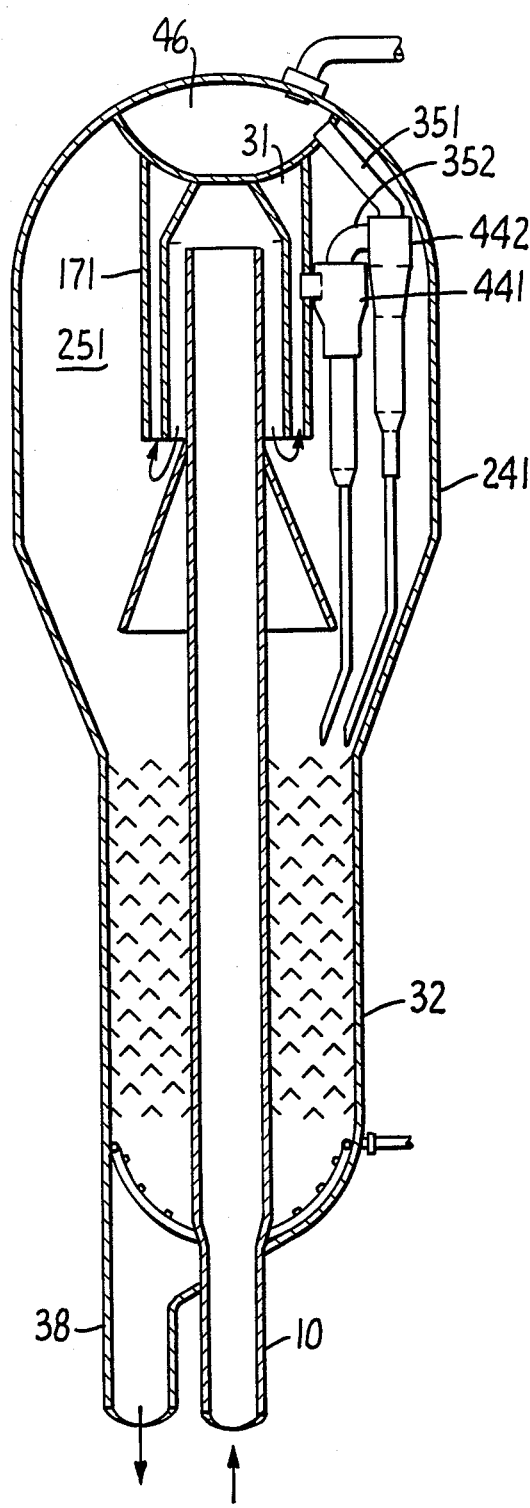
FIG. 2.
FIG. 3.

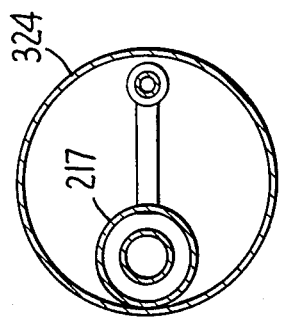
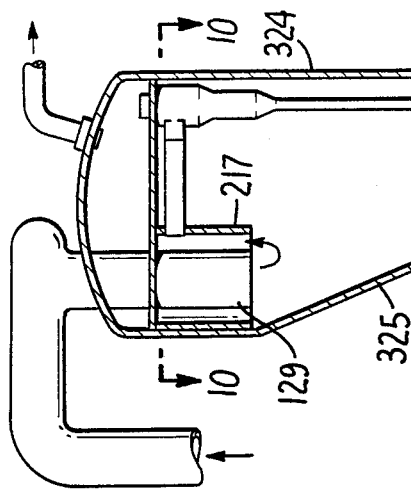
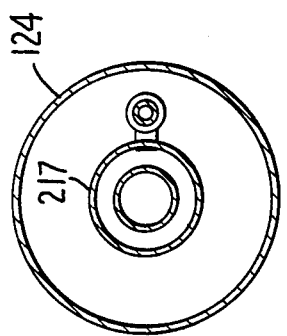
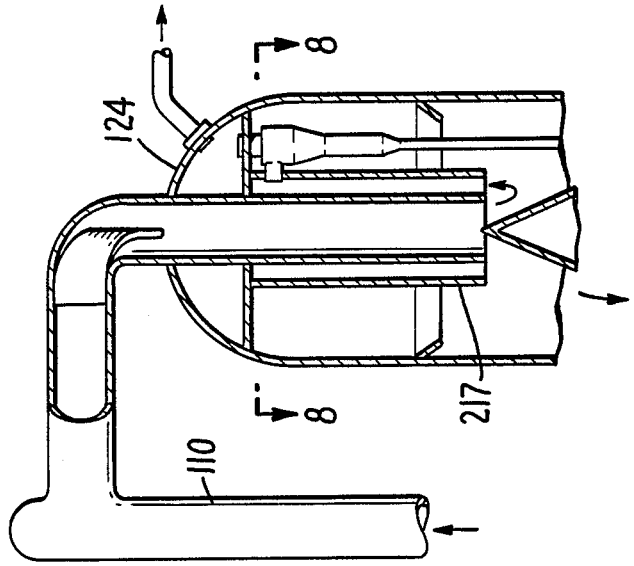
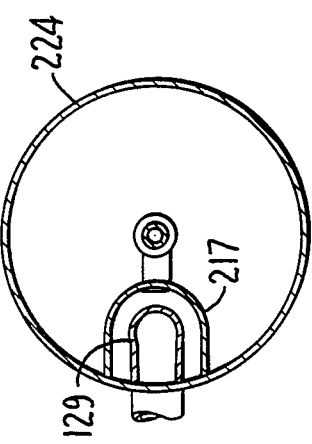
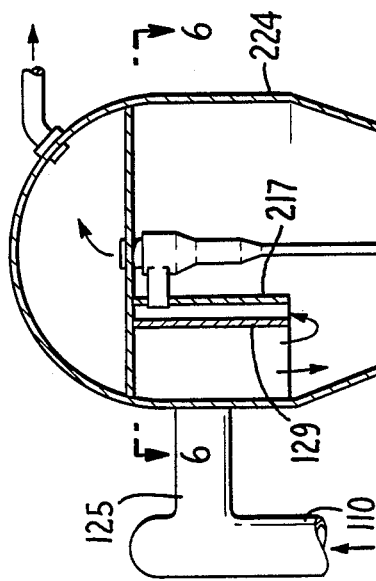

METHOD AND APPARATUS FOR IMPROVED VAPOR RECOVERY FOR FLUIDIZED CATALYTIC CRACKING PROCESS

This application is a division of application Ser. No. 692,443, filed Jan. 16, 1985, now U.S. Pat. No. 4,591,427, issued May 27, 1986. That application was a continuation-in-part of application Ser. No. 444,328 filed Nov. 24, 1982, now abandoned.

BACKGROUND OF THE INVENTION

1. Field of the Invention

This invention relates to a method of fluidized catalytic cracking. More particularly, it relates to an improved method for recovery of hydrocarbon vapors from the reactive mixture of hydrocarbonaceous material and catalyst in a separator after such mixture is discharged from a riser reactor.

The object of this invention is to reduce both secondary cracking of valuable liquid products and reduce the solids content of recovered hydrocarbon products by rapid and efficient separation of cracking catalyst from product hydrocarbon vapors. This separation of catalyst solids from hydrocarbon vapors is made more efficient by construction of a special zone between the exit of the reactor tube and the entrance of the cyclone separators. This zone is oriented relative to the reactor tube in such a way that all vapors from the reactor tube travel through it but surprisingly few catalyst particles can enter. This special zone rapidly separates the hydrocarbon products from nearly all catalyst particles upon leaving the reaction zone and reduces the catalyst loading on the cyclone separators which further separate catalyst from product vapors in the conventional manner. The special separation zone is positioned so that the vapor must turn through an acute angle after exit from the riser. Preferably, for minimal secondary catalytic cracking, due to excessive time at elevated temperatures in the presence of catalyst, or minimal solids in the recovered vapor due to catalyst entrainment, or both, the inlet to a separate vapor recovery zone is located so that vapor flow to the cyclone intake is adjacent to and substantially countercurrent to the direction of flow of the reaction mixture discharge into the separation vessel. Most preferably, the vapor recovery zone is formed as a low volume shroud surrounding the riser reactor pipe and extends through the upper center portion of the vessel, with the intake to the cyclones enclosed in the vessel connected to the upper end of the shroud. In this way catalyst in the hydrocarbon vapor-catalyst mixture entering the vessel is carried by inertia (and if downwardly, also by gravity) in the same direction as the conduit discharge. In accordance with the present invention, rather than directing the flowing mixture directly into cyclone separators, or disposing the cyclone inlets at substantially 90° to the reactor discharge in the separator vessel, vapor that is least contaminated by catalyst fines is shown herein to be adjacent to the riser reactor outlet. Such vapor is vented through the vapor recovery shroud to the cyclones so that it is promptly delivered to a distillation column. The entry to such a vapor recovery shroud is placed within the vessel adjacent to the riser reactor discharge or outlet so that vapor must turn through an angle substantially greater than 90° to enter the zone, and preferably at an acute angle of at least 180°±30°, and most preferably, 180° to the direction of flow from the riser reactor outlet.

2. Description of the Prior Art

Fluidized cracking of heavy petroleum fractions is one of the major refining methods to convert crude petroleum oil to useful products such as fuels for internal combustion engines. In such fluidized catalytic cracking, (known popularly as "FCC") high molecular weight hydrocarbon liquids and vapors are contacted with hot, finely divided solid catalyst particles in an elongated riser or transfer line reactor. The reactor is usually in the form of a riser tube and the contact time of the material is on the order of a few seconds, say one to ten seconds, and generally not over about five seconds. This short contact time is necessary to optimize generation of gasoline and middle distillate fractions. By proper selection of temperatures and reaction times the catalytic cracking reaction is "quenched" so that economically undesirable end products of such a reaction, light gases and coke, are held to a minimum and the yield of desired products, gasoline and middle distillate oils, is at a maximum. During this short reaction period, catalyst at temperatures in the range of about 1100° F. to 1450° F. contacts a hydrocarbon feed stock, frequently in the form of vacuum gas oil, cycle oil or the like, heated initially to a temperature of from about 300° F. to 750° F. Generally the hot catalyst and hydrocarbonaceous material mixture is fluidized by steam and the reacting hydrocarbon gases. Reaction of the mixture creates large volumes of gaseous hydrocarbons by vaporization of the oils due to exposure to hot catalyst and by cracking the hot hydrocarbons to lighter gaseous hydrocarbons. The hydrocarbon vapors and catalyst mixture flow out of the riser tube into a separator or disengaging vessel. The spent catalyst is separated, primarily by gravity, and inertial forces acting on the catalyst, in the separator vessel and pass downwardly through a stripper section for return to a regenerator. Fluidizing steam also flows up through the down-flowing catalyst to assist in stripping hydrocarbon vapor from the spent catalyst. Heat for the process is added to the system by burning the coke, primarily carbon, on the spent catalyst by oxygen flowing into the regenerator. The regenerated and heated catalyst is then recirculated to the riser reactor. The desired product, hydrocarbon vapor, is recovered overhead from the separator vessel. Generally, this recovery is through one or more cyclone separators within the separator vessel connected to a plenum chamber or common piping and directly piped to a distillation column. Vapor flow through the cyclone separators extracts entrained catalyst fines. The catalyst fines recovered by the cyclone separators are delivered to the stripping section through "dip legs" connected to the lower part of the disengaging vessel in which the stripper is located. The hydrocarbon vapors from the cyclones are recovered overhead, either through a plenum chamber or through additional stages of cyclones, or through direct piping to the product fractionator.

A particular problem in recovery of the vapor is that in spite of the separating action of the cyclones, even several stages, catalyst "fines" tend to flow with the vapor particularly at high inlet velocities and thus get transported with the hydrocarbon vapors to the distillation column. Further, prolonged contact of the hydrocarbonaceous vapors with catalyst results in secondary cracking of the desired gasoline and middle distillate fractions generated in the initial catalytic reaction. Such secondary cracking creates additional gases which are less valuable than the middle distillate oils such as gasoline from which the additional gases are made. Catalyst fines additionally degrade the recovered distillate product, and create a recovery or disposal problem. Further, high levels of catalyst entering the cyclones promote secondary cracking and fines carryover. Since the catalyst particles normally include precious materials such as zeolite crystals containing rare earth metals and sometimes platinum or palladium, the cost of replacement or recovery of these materials may be substantial. Catalyst loss in the overhead requires make-up catalyst to be added (at significant cost) to the fluidized catalytic cracking system. Any catalytic material recovered in the fractionator bottoms lowers the economic value of that oil. If economically feasible the fractionator bottoms are returned to the cracker (at the expense of yield selectivity loss) or the catalyst is allowed to settle out in an expensive decant oil separator vessel.

It is known, as noted, that the output from a riser reactor may be directly discharged into a cyclone separator system. U.S. Pat. No. 3,785,782, Cartmell, illustrates one system in which a riser discharges the entire mixture directly into a first stage cyclone and the vapor passes through a second stage cyclone prior to recovery.

U.S. Pat. No. 4,066,533, Myers, et al, discloses a system in which a riser pipe enters a separator vessel with the catalyst mixture being discharged vertically upward against the end wall of a separation vessel. Vapors are recovered from near the end of the reactor pipe directly into a first and second stage cyclone arrangement for recovery of the vapor. U.S. Pat. Nos. 4,295,961 and 4,310,489, both issued to Fahrig, et al, disclose systems in which the riser pipe enters the separator vessel and upward flow is diverted downwardly by a discharge shroud. Vapor is withdrawn from the separator vessel through cyclone separator inlet openings at 90° to the shroud.

In other systems generally used in fluidized catalytic cracking, and cyclone separator intake is simply positioned in an upper part of the separator vessel. The catalyst and hydrocarbon vapor mixture is discharged, either up or down, by the reactor riser into the separator. Where the riser enters the center of the vessel, most frequently the cyclones are positioned around the outside of the vessel so that the diplegs return catalyst fines by gravity to the stripper through the annular area around the riser pipe. U.S. Pat. No. 3,957,443, Strickland, et al, and U.S. Pat. No. 2,514,288, Nicholson, are illustrative of this arrangement. In Nicholson, reactor discharge is directed upwardly into the separator vessel. In Strickland, flow is downwardly through a shroud around the riser pipe. However, a valve mechanism permits the catalyst and hydrocarbon mixture to be discharged directly upward toward the top of the vessel by a valve means. U.S. Pat. No. 3,841,843, Williams, et al, discloses a similar arrangement for flow reversal of the discharge from the reactor pipe into the separator vessel and to direct the catalyst downwardly toward the stripper zone. U.S. Pat. No. 3,243,265—Annesser, assigned to the assignee of the present invention, discloses a concentric discharge shroud around the riser pipe to discharge the resultant mixture of hydrocarbonaceous material and catalyst downwardly into a large diameter separation vessel.

U.S. Pat. No. 3,785,962, Conner, discloses a system in which the riser pipe discharge includes a 90° turn so that mixture flow is essentially downward, but the vapor inlet to the cyclones is directly adjacent to the riser discharge so that in effect vapor and any entrained particles must turn 90° to pass from the reactor discharge into the vapor recovery cyclones.

U.S. Pat. No. 3,826,738—Zenz discloses a riser reactor pipe which includes an outer concentric pipe section for direct discharge of the hydrocarbon-catalyst mixture downwardly into a vessel having an enlarged diameter stripping section. The vessel is formed with a small diameter section for vapor recovery prior to cyclone separation that is concentric to the discharge section of the riser pipe. Due to catalyst discharge into the stripper section, there is little room for catalyst to separate from the product hydrocarbon vapors. Further, the velocity of the vapors rising from the stripping section is increased by the restricted volume in the vapor recovery section so that rather than decelerating upon release to a large diameter vessel after discharge, the vapor velocity is accelerated which prevents disengagement of catalyst rising with vapors from the stripping section. More importantly, the cyclones cannot be accomodated within the restricted volume of the vessel so they must be positioned outside. This creates a safety hazard because hot combustible vapors, such as gasoline, propane, butane and light oils, must be well-contained to avoid the risks of fire and explosion in the atmosphere.

Such problems arise because the cyclones are highly susceptible to erosion and abrasion by the flow of catalyst with the product vapors. Such erosion increases as the cube of the velocity ($V^3$) and the highest velocity of an FCC system is in the cyclones. Practical and safe designs for commercial installation do not have high erosion components such as cyclones containing hot combustible gases on the exterior of the vessel. Exterior walls that confine combustible gases must contain low velocity flows to minimize leakage caused by erosion.

SUMMARY OF THE INVENTION

As particularly distinguished from the prior art, the present invention is directed to a fluidized catalytic cracking system in which improved vapor recovery with reduced secondary cracking or catalyst carry-over is obtained by isolating the intake to at least one hydrocarbon vapor recovery cyclone in a separator vessel through a vapor recovery zone also within the separator vessel. The intake to the vapor recovery zone is so located relative to the discharge outlet of the riser reactor in the separator vessel so that vapor must enter such cyclone intake at an acute angle substantially greater than perpendicular to the discharge from the reactor tube. In a preferred form, such direction is countercurrent upwardly relative to the downward discharge from the reactor pipe. More particularly, such direction is within ±30° of countercurrent and in its most preferred form is 180°. Preferably, the inlet to the vapor recovery zone is at a level not lower than the discharge level.

The particular advantages of the present invention are that it immediately separates the vast majority of catalyst particles from the product vapors so that overcracking of desirable hydrocarbon products such as gasoline is reduced and catalyst loading of the cyclones is also reduced lowering the contamination of product with catalyst particles. Such results are achieved in apparatus form by limiting inlet to the cyclones through a shroud arrangement which draws vapors from the space closest to the reactor outlet, but lowest in catalyst density. The shroud arrangement forms a special zone, generally in a central upper portion of a large diameter separator vessel. Such zone is in addition to the primary low-velocity zone formed by the large vessel itself which decreases the velocity of the mixture after discharge from the riser pipe into such a large diameter vessel. Such a decreased velocity permits normal gravity separation of catalyst particles from hydrocarbon vapors. Thus, hydrocarbon vapor components either initially released from the reactor riser or recovered from the catalyst by steam stripping may be drawn from the portion of the vessel having the lowest density of catalyst particles. Preferably, the cyclones within the vessel are disposed radially outwardly from the vapor recovery shroud and the cyclone inlets are connected through a wall of the shroud. Alternatively, the cyclone itself may be positioned within the shroud and the cyclone vapor output directed radially through the shroud wall to a second or further cyclone means. Return of separated catalyst is through dip legs extending downwardly in the vessel into the stripper section. In this way, the cyclones, which are most susceptible to catalyst erosion and vapor leakage, are enclosed within the vessel so that any escape of such vapor is entrapped in the separation vessel for ultimate recovery, rather than creating a fire hazard or contributing to pollution.

In a preferred form of fluid catalytic cracking apparatus, discharge of the vapor and catalyst mixture from the riser reactor is generally downwardly and flow is deflected outwardly toward the walls of the vessel. In one form, such deflection may include a conical member which radially disperses spent catalyst flow (and residual hydrocabons still residing on the catalyst) outwardly. In such an arrangement, the inertial and gravity effects create a partial cyclonic action on the discharged catalyst particles. With the vapor recovery shroud of the present invention positioned generally annular to the reactor pipe discharge, the vapor recovery shroud inlet is preferably located directly adjacent the riser discharge outlet with the inlet at substantially the same level or slightly higher as that of the discharge outlet.

In an arrangement where the discharge of the riser into the vessel is deflected downwardly and radially outward, the zone of low catalyst concentration for the vapor recovery shroud is within the upper central portion of the vessel. Thus, vapor with the least amount of entrained catalyst enters the cyclones from such a rarefied zone solely by pressure difference rather than by inertial forces which act more strongly on the catalyst particles.

Further objects and advantages of the present invention will become apparent from the following detailed description of the preferred embodiments of the invention which are illustrated and described in connection with the accompanying drawings. The drawings form an integral part of the present specification and illustrate the operating advantages and principles of the present invention.

IN THE DRAWINGS

FIG. 1 is a vertical elevation view, partially in cross-section, of a first embodiment of the preferred form of the invention in a fluid catalytic cracking system in which a vapor recovery zone is formed in an upper portion of the separator vessel wherein the riser reactor enters the bottom of the vessel and the reaction mixture flows through a reversing shroud to discharge downwardly into the vessel over a conical catalyst disengaging baffle.

FIG. 2 is a vertical elevation view, partially in cross-section, of an alternate embodiment of the invention, illustrating another form of a separator vessel with the vapor recovery shroud around a reactor pipe, discharging directly downwardly.

FIG. 3 is vertical elevation view, partially in cross-section, of a further embodiment of the invention in which the vapor recovery shroud forms a vapor separation zone with limited vapor holdup within the separator vessel has its entry at the same level as the discharge end of the riser reactor in the separator vessel.

FIG. 5 is a vertical elevation view, partially in cross-section, of the upper portion of a separator vessel in which an external riser reactor enters the separator vessel sidewall with vertical downward discharge slightly off-center so that the catalyst hydrocarbon mixture discharges against a sloped wall of the vessel and the vapor recovery shroud is around the reactor pipe discharge.

FIG. 6 is a cross-sectional plan view of the arrangement of FIG. 5 taken in the direction of arrows 6—6.

FIG. 7 is a vertical elevation view, partially in cross-section, of the upper end of a separator vessel with an external riser reactor entering the top center of the vessel and the vapor recovery shroud concentric with the riser discharge.

FIG. 8 is a cross-section plan view of the embodiment of FIG. 7 taken in the direction of arrows 8—8.

FIG. 9 is a vertical elevation view, partially in cross-section, of another embodiment of the invention illustrating the upper portion of a separator vessel in which an external riser enters the top of the separator vessel and discharges the reaction mixture against a sloped wall of the separator vessel.

FIG. 10 is a cross-sectional plan view of the embodiment of FIG. 9 taken in the direction of arrows 10—10.

Figure 13:
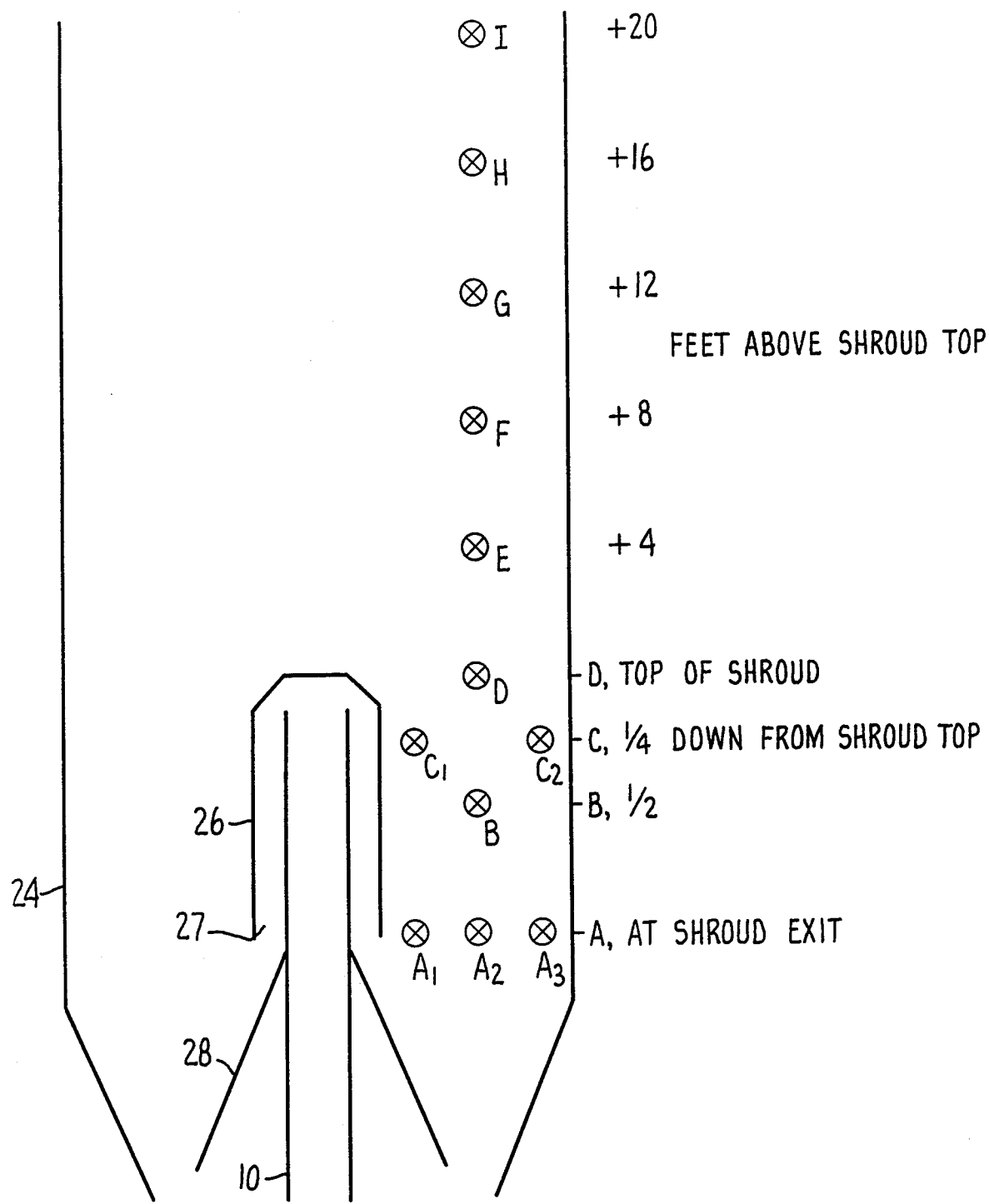
FIG. 13 is a schematic diagram of a reactor-separator vessel similar to the arrangement of FIG. 1. The designated positions are those at which catalyst density measurements were made in a pilot test unit.

FIGS. 14, 15, 16 and 17 are graphs illustrating experimental results obtained in model studies by placing the inlet of a separation cyclone at selected vertical levels and radial distances away from a reactor riser discharge shroud as indicated in FIG. 13. These graphs indicate effects of both inlet velocity at the reactor discharge and radial position of recovery cyclone intake in the vapor recovery zone. They particularly illustrate that position $A_1$ in FIG. 13 is the best place to withdraw hydrocarbon vapors from the separator vessel. This position is best because it is the most rarified in catalyst density, and is the shortest distance from the reactor outlet. The shortness of distance results in minimum overcracking due to prolonged contacting of hydrocarbon vapors with spent catalyst at elevated temperatures. The lowness of catalyst concentration results in reduced solids content of hydrocarbon products transferred to the fractionator.

Figure 1:
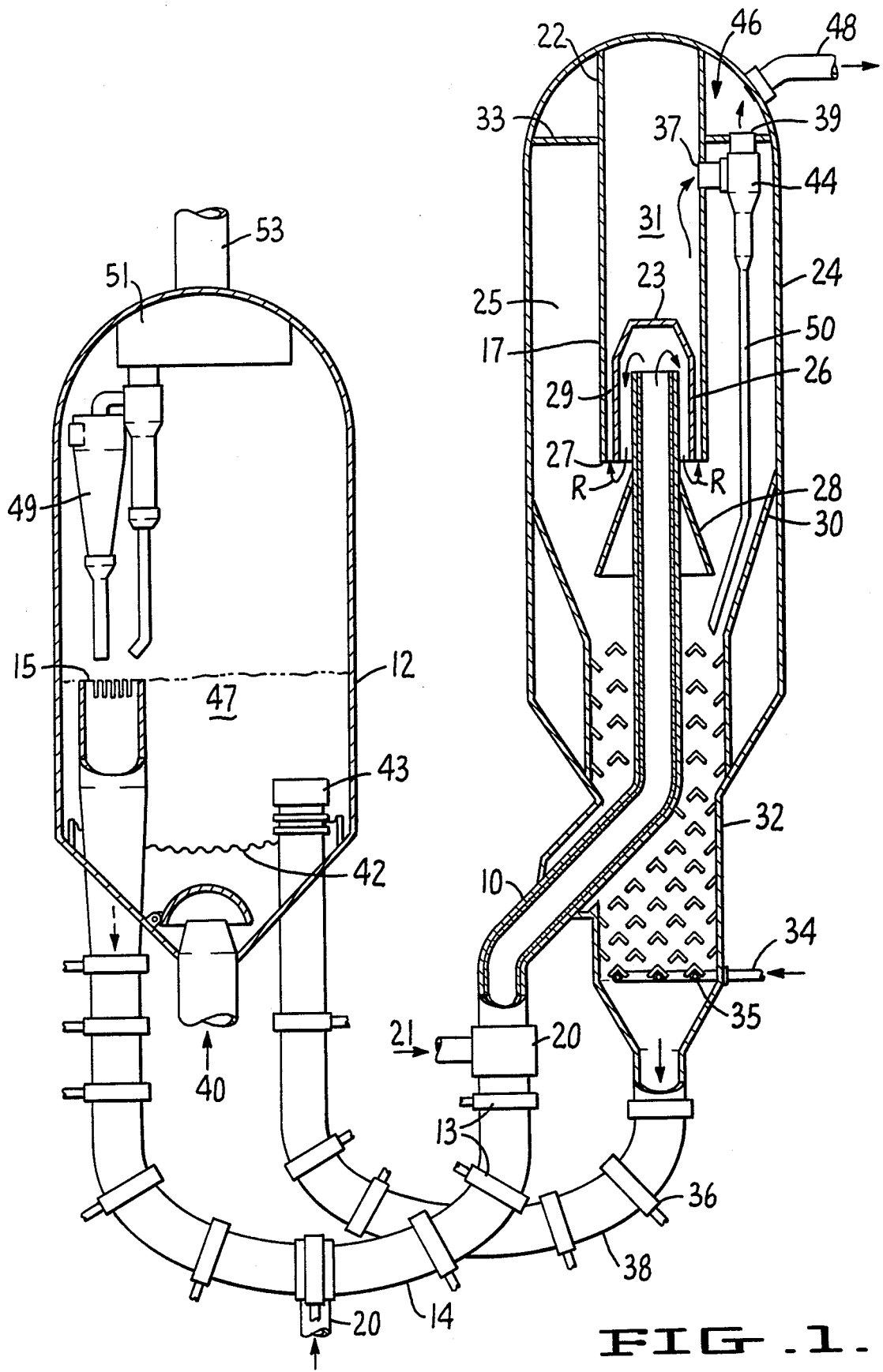

FIG. 18 is a vertical cross-sectional view, partially in cross-section of a separation vessel arrangement similar to FIG. 1, to which the concentric vapor shroud has been applied and in which the riser pipe has been extended upwardly in the large diameter vessel and the discharge shroud correspondingly shortened.

FIGS. 19A, 19B and 19C are schematic representations respectively of an arrangement similar to that in FIG. 18 and two other arrangements for recovery of FCC product vapors from separator vessels. In the 19B and 19C arrangements discharge of the mixture of hydrocarbon vapor and catalyst from the riser pipe is upward, rather than downward, as in FIG. 19A. These diagrams illustrate the configurations tested in the pilot plant for which comparative results are shown in FIG. 20.

FIG. 20 is a graph similar to FIGS. 14, 15, 16 and 17 illustrating comparative results of the arrangements of FIGS. 19A, 19B and 19C. The configuration shown in FIG. 19A is clearly superior. It delivers the least amount of catalyst to the cyclones.

FIG. 21 is a vertical elevation view, partially in cross-section, similar to FIG. 2 illustrating another embodiment of the present invention in which the first stage of the vapor recovery cyclones are within the vapor recovery shroud.

DESCRIPTION OF THE PREFERRED EMBODIMENTS OF THE INVENTION

Referring now to the drawings, and in particular FIG. 1, there is illustrated an FCC unit to which the present invention is particularly applicable. The system generally comprises a riser reactor pipe 10 to which heated catalyst is supplied by regenerator 12. Catalyst is fluidized by gas, preferably steam, supplied by a series of nozzle rings 13 along U-tube 14. The steam transports catalyst particles supplied by gravity from intake 15 and conveys them to riser pipe 10. A hydrocarbon feed stream, such as that supplied through feed nozzles 20 and feed line 21 enters riser reactor pipe 10 for contact with the heated, fluidized catalyst. The substantially instantaneous reaction of mixing heated (generally regenerated) catalyst and hydrocarbon feed generates voluminous quantities of vapor by vaporization of the oil and cracking of the hydrocarbons which carries the mixture upwardly in reactor 10 and discharges it into separator vessel 24. In the embodiment of FIG. 1, this discharge is generally upward but is deflected downwardly by a discharge shroud 26 surrounding the upper part of riser pipe 10 so that flow of the resultant mixture of catalyst and hydrocarbonaceous material, and primarily the catalyst, is downwardly into separator vessel 24. Discharge from shroud 26 is deflected outwardly by a baffle, such as deflector cone 28, toward sidewall 30 of vessel 24 so that the inertia of the catalyst, along with gravity effects on the catalyst, induces a partial cyclonic action to assist in separation of residual hydrocarbon vapor from the catalyst.

Spent catalyst is then returned to regenerator 12 through stripper means 32, formed either independently or as the lower part of vessel 24. Hydrocarbons are further removed from the spent catalyst in stripper 32 by introduction of steam, such as by line 34 feeding nozzles 35 at the lower end of stripper 32. Catalyst returns to regenerator 12 by introduction of steam through a series of nozzle rings 36 along return U-tube 38 for transport of such spent catalyst back to regenerator 12. Spent catalyst is then regenerated by addition of oxygen, as by line 40 to burn residual coke, primarily carbon, from the catalyst particles supported on grid 42. This supplies heat to the catalyst circulating in the system which returns from bed 47 through overflow intake 15. Offgas from the burned coke is vented from regenerator 12 through cyclone 49, plenum 51 and flue pipe 53.

Figure 11:
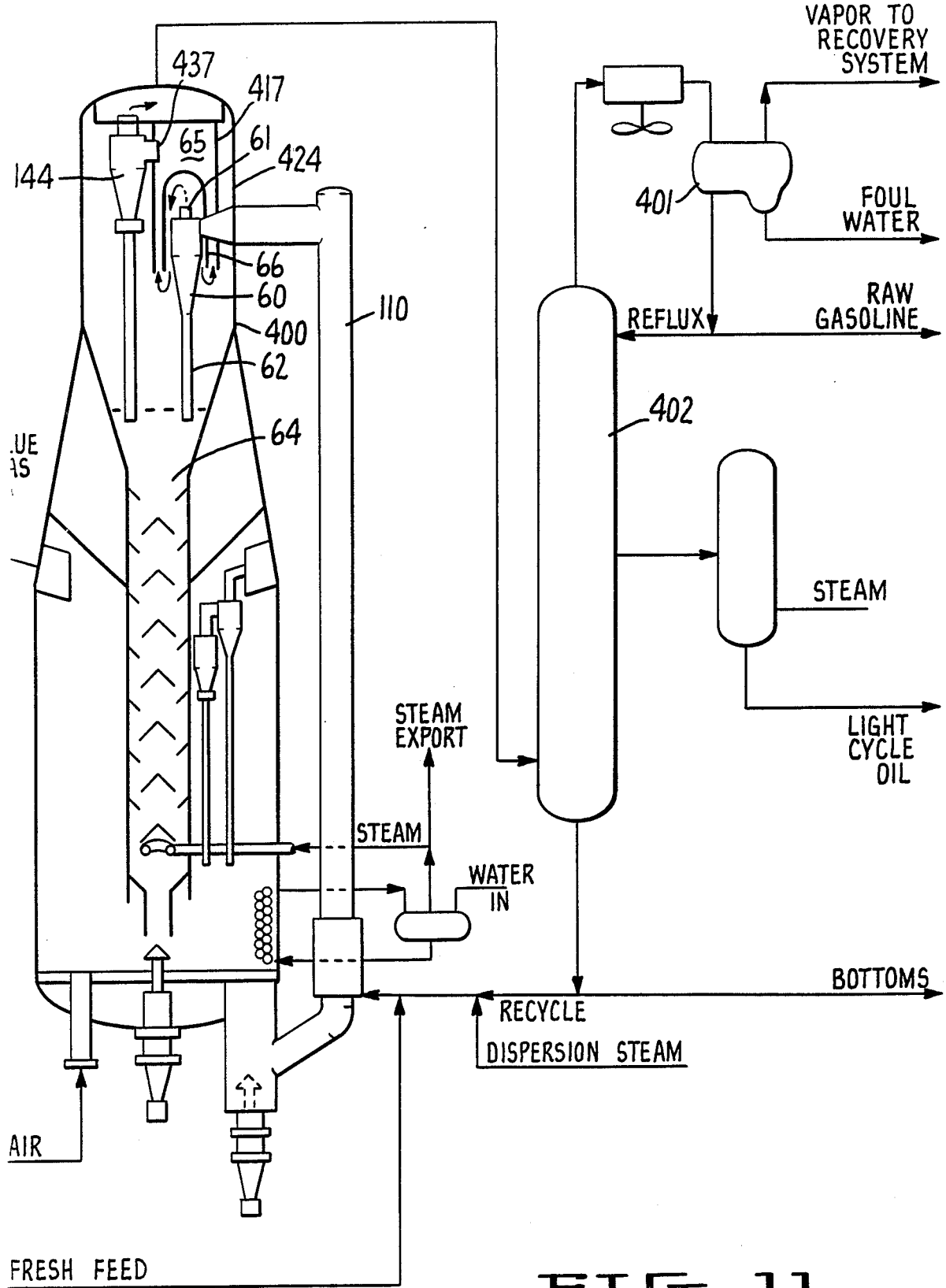
FIG. 11 is a vertical cross-sectional view, partially in cross-section, illustrating an FCC unit wherein the regenerator, riser pipe, separator and a catalyst stripper are incorporated into a single vessel. As shown there, vapor recovery from the separation vessel is through a vapor recovery shroud adjacent to a shroud around a primary cyclone to which the entire reactor effluent is delivered.

In accordance with the present invention, separation of vapor from catalyst particles circulating in the vapor space 25 above discharge shroud 26 is uniquely enhanced by providing an auxiliary zone within the central and upper end of large diameter separator vessel 24 to transport product vapors from the catalyst rarefied area adjacent to the reactor outlet to the cyclone inlets. As noted above, vessel 24 is generally several times in diameter larger than riser pipe 10 so that it forms a reduced pressure volume for gravity separation of catalyst from the reacted mixture. Accordingly, vessel 24 forms a quiescent zone for separation of catalyst particles passing to stripper section 32 at the bottom of vessel 24 from the product vapors. In FIG. 1 prompt separation of vapor from vessel 24 is promoted by concentric vapor recovery shroud member 17 which surrounds discharge shroud 26 covering the upper end of reactor pipe 10. In accordance with the present invention, shroud 17 forms the sole outlet for venting vapor from vessel 24 through pipe 37, the inlet for cyclone 44; cyclone 44 then separates catalyst fines from the vapor and returns such catalyst fines by dip leg 50 to stripper 32. Cyclone outlet line 39, passes the vapor into plenum 46. Vapor from plenum 46 is piped to a distillation system by conduit 48. (A typical distillation system for recovered products in the hydrocarbon vapors is illustrated in FIG. 11.) In FIG. 1, cyclone 44 is shown as a single stage unit. In practice, such separators may include several successive stages as indicated in FIG. 3 or several separate stages as in FIGS. 2 and 11.

As will be more fully discussed in connection with results of model tests, as seen in FIGS. 13 to 17, the location and configuration of vapor recovery shroud 17 and its inlet 27 is critical. Specifically, the level for the input to vapor recovery shroud 17 in any separator vessel is optimally located at substantially the same level as the outlet of reactor discharge shroud 26. In this way, vapor released from the mixture must make a sharp turn of approximately 180° as indicated by arrows R. To assure that this turn is relatively sharp and near 180°, the diameter of vapor shroud 17 is not much greater than the diameter of discharge shroud 26. It is accordingly substantially smaller in diameter than vessel 24. FIG. 17 shows that the size of opening to the vapor recovery shroud not only affects its inlet velocity but also the rate at which catalyst is delivered to the cyclones. To make vapor residence time short and to reduce secondary cracking, the volume of chamber or zone 31 is made small between vapor recovery shroud 17 and extension 22 above cap 23 of shroud 26. Plenum 46, formed by plate 33, extension 22 and the upper end of vessel 24 is also made small for short residence time. Cyclone 44 discharges into plenum 46 through pipe 39. As indicated, the intake of cyclone 44 is through side entry conduit 37. This requires vapor in zone 29 to enter cyclone 44 directly for final recovery of catalyst fines through dip leg 50 before vapor is delivered to plenum 46 and piped to the distillation column by conduit 48.

The location of cyclone 44 is also readily accommodated by large diameter vessel 24. This is particularly important because of the erosion of cyclone 44 by catalyst fines, usually of smaller particle size than the average catalyst in the plant, carried by the vapor. Because the velocity of vapor through the cyclones is higher than any other portion of the FCC system, such abrasive particles subject the cyclones to severe erosion. Such severe erosion varies with the cube of the velocity of the vapor carrying the particles. Accordingly, it is vital that the cyclones be enclosed within the vessel so that any leakage of such vapor (usually consituents of gasoline, diesel, kerosene and lighter ends such as butane, propane and ethane) will not create a severe fire, explosion or pollution hazard. By properly confining the cyclones within the flow system, as within vessel 24, such problems are avoided.

FIG. 2 illustrates another embodiment of an FCC reactor-separator having a vapor recovery zone formed therein by vapor recovery shroud 17. In this form of FCC unit, separator vessel 24 includes a catalyst and hydrocarbon vapor discharge shroud 26 for directing flow downwardly into vessel 24, but without further deflection, as in FIG. 1. As particularly indicated, annular passage 29 between shrouds 17 and 26, including extension 22, is maintained small with respect to the diameters of the shrouds and vessel 24. This assures that all vapor entering zone 29 must turn through substantially 180° from its flow with catalyst out of discharge shroud 26 and is promptly delivered to the cyclone separators to further minimize overcracking. A pair of diametrically opposed cyclone separators 44 within vessel 24 are indicative of the commercial arrangement of cyclones which normally includes from six to twelve pairs of dual cyclones. Intakes 39 to the cyclones are attached to the upper wall of shroud 17. Vapors from cyclones 44 rise into a relatively small plenum 46 formed by concave plate 33 and the upper wall of vessel 24 through pipes 35. Catalyst from cyclones 44 return to stripper 32 through dip legs 50.

FIG. 3 illustrates another form of FCC unit to which the present invention may be applied. It will be noted that riser reactor 10 enters from directly below and along the axis of separator vessel 241. Spent catalyst returning to a regenerator, such as 12 in FIG. 1, from stripper 32 flows through an off-center return line 38. Further, a two stage cyclone arrangement within vessel 241, is connected to vapor recovery zone 31 by a first stage cyclone 441, and a second stage cyclone 442 located between plenum 46 intake line 351 and the vapor outlet 352 of cyclone 441. As shown in this embodiment, large diameter separator vessel 241 is relatively short so that overall vapor space 251 therein is limited. Provision of vapor recovery shroud 171 permits excellent recovery of hydrocarbon vapor with little overloading of cyclones 441 and 442 by entrained catalyst fines. This is particularly valuable in permitting existing FCC units to be retro-fitted with a vapor recovery shroud, such as 171, without substantially alterating the vessel internals or extending the height of vessel 241. Further it shows the desirable compactness of the vapor flow path for rapid transfer to a distillation system and prompt quenching of secondary cracking.

Figure 4:
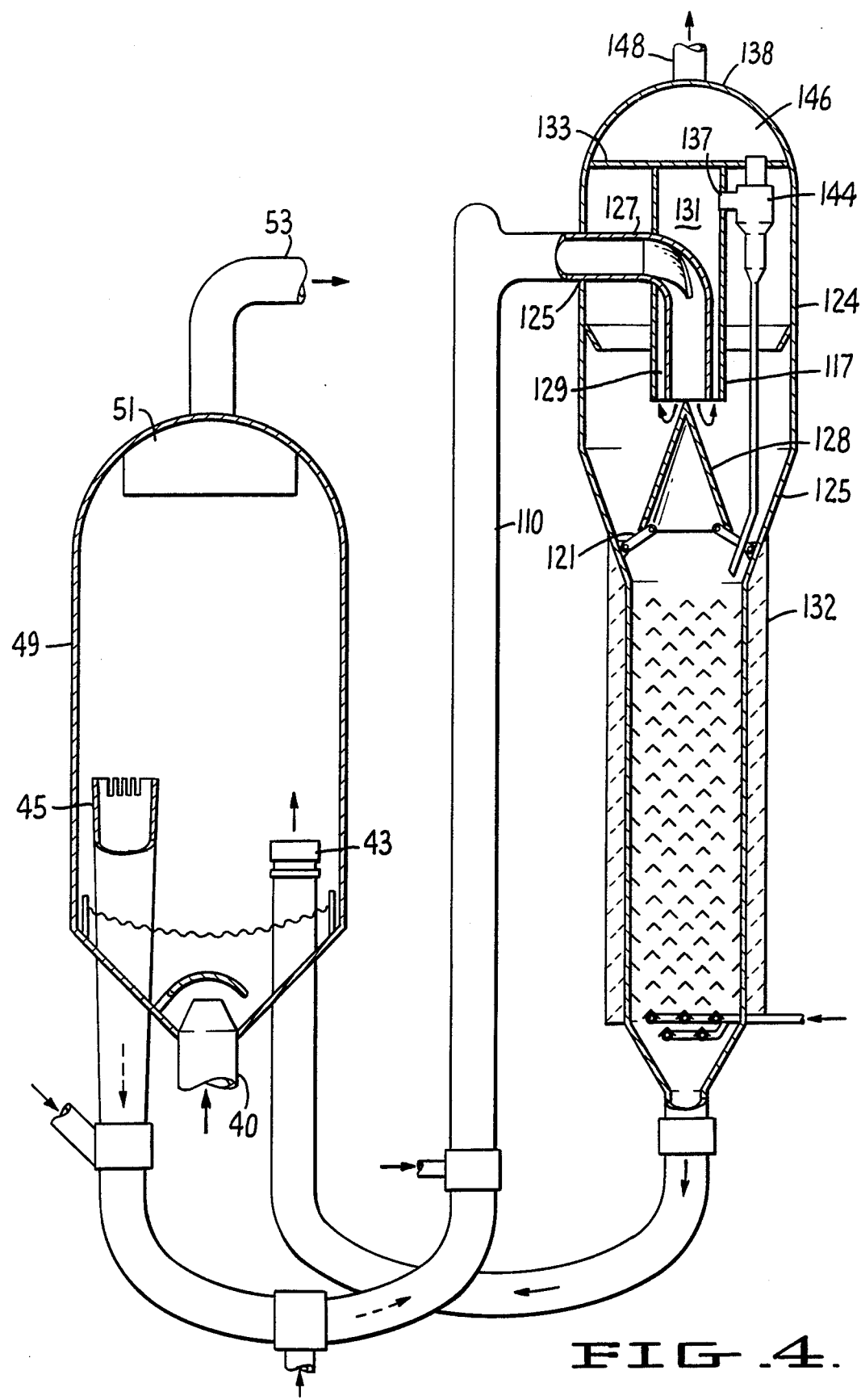
FIG. 4 is a vertical elevation view, partially in cross-section, of a fluid catalytic cracking apparatus in which an external riser reactor enters the side of the separator vessel and discharges against a conical deflector baffle with the vapor recovery shroud positioned concentric with the reactor conduit.

FIG. 4 is a complete schematic diagram of a fluid catalytic cracking unit using an external, or transfer pipe, riser 110 which enters catalyst disengaging vessel 124 through a side opening 125. In this way the fluid mixture of catalyst and hydrocarbonaceous material, primarily vapor, enters the vessel through a horizontal pipe section 127 and then makes a 90° turn downwardly into discharge pipe section 129. In this embodiment, vapor recovery shroud 117 closely surrounds discharge pipe section 129 so that vapor released by discharge from section 129 must turn through a substantial angle, greater than 90° and preferably 180°, to enter vapor recovery shroud 117. Thus, while catalyst particles are deflected outwardly by cone member 128 for further cyclonic separation, a major portion of the vapor is directly recovered by a first reverse turn from discharge 129 into vapor recovery shroud 117. The cyclonic separating action is assisted by the angle of cone 128 and tapered sidewall 125 at the transition section between large diameter catalyst disengaging vessel 124 and stripper section 132. Cone 128 is held as indicated in a central position and directly below the discharge opening of pipe 129 by mounting links, or brackets, 121.

Vapor is recovered through vapor recovery zone 131 by cyclone 144 whose intake 137 is positioned in the wall of vapor shroud 117. The function of cyclone 144 is the same as that described in connection with cyclone 44 in FIG. 1. Vapor from cyclone 144 is collected in plenum chamber 146 formed by wall 133 and upper end 138 of vessel 124. Recovered hydrocarbon vapors are piped by offtake line 148 to a distillation column. Although not illustrated, the volumes of zone 131 and 146 may be reduced to further minimize the time hydrocarbonaceous vapors spend at elevated temperatures and in the presence of catalyst particles.

FIGS. 5 to 10 illustrate alternate embodiments of vapor recovery shrouds suitable for use in an FCC system, such as that shown in FIG. 4. For example, in FIG. 5, side entry portion 125 of riser pipe 110 terminates in a downflow section 129 adjacent a downwardly sloping wall 225 of an alternate form of catalyst separation vessel 224. A particular advantage of this arrangement is that the downflowing mixture of catalyst and hydrocarbonaceous vapor is discharged directly against wall 225 for partial cyclonic separation of the vapor from the catalyst. Accordingly, in the present arrangement, the vapor recovery shroud 217 is positioned to surround or at least partially surround discharge pipe 129.

In FIGS. 7 and 8, riser reactor pipe 110 enters the top of vessel 124 rather than through a side opening and riser pipe 110 fills the center of vapor shroud 217 to reduce its space volume.

In FIGS. 9 and 10, vapor recovery shroud 217 is also placed around discharge pipe 129. In this particular arrangement, catalyst disengaging vessel 324 is shown as being asymmetrical in that a single sloped side, or alternately a tilted plate, 325 provides a partial cyclonic action to augment catalyst disengagement from the reaction mixture. In each of the three embodiments of FIGS. 5, 7 and 9, vapor will, of course, in accordance with present invention pass through an angle of about 180° to enter vapor recovery shroud 217.

Figure 12:
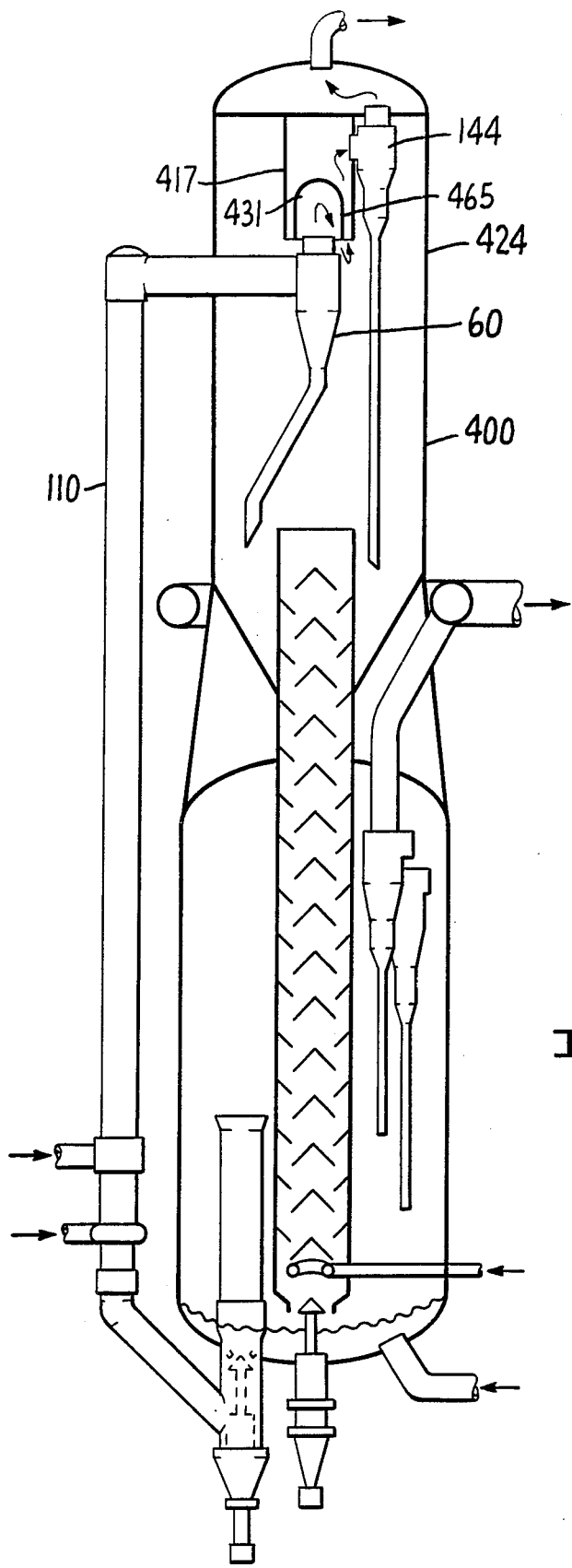
FIG. 12 is a vertical elevation view, similar to FIG. 11, of an alternative arrangement of a vapor recovery shroud in a stacked separator-regenerator fluidized catalytic cracking unit.

FIGS. 11 and 12 illustrate other arrangements of fluid catalytic cracking systems in which the reactor-riser pipe, regenerator, catalyst separation or disengaging vessel and stripper unit are constructed in a single unitary vessel. These units include an external riser pipe.

These Figures particularly illustrate application of the present invention to such alternate large diameter separation vessels with a vapor recovery zone to feed at least one primary cyclone separation unit within the separation vessel. For example, the entire flow from external riser pipe 110 discharges through cyclone 60 into separation zone 424, formed as an integral top portion of the fluid catalytic cracking unit vessel 400.

A more detailed disclosure of the operation of the embodiments of FIGS. 11 and 12 may be found in co-pending application Ser. No. 363,496, filed Mar. 31, 1982, assigned to the assignee of the present invention. The disclosure of that application is incorporated herein by reference thereto. As particularly distinguished from the present embodiments of FIGS. 11 and 12 which are shown in said application, the present invention provides a separate vapor recovery shroud through which the recovered vapors are accessible to a cyclone separator. Such vapor may only reach cyclones 144 after a substantial turn from the riser reactor discharge. Specifically, in the arrangement of FIG. 11, primary cyclone 60 includes a vapor release opening 61 at the top of cyclone 60 and a spent catalyst discharge tube 62 through which a mixture of spent catalyst and entrained vapor passes for discharge into concentric stripper zone 64. Vapor recovery shroud 417 surrounds a primary vapor release zone 65 wherein vapor coming off outlet 61 of cyclone 60 reverses flow direction of the released vapors so that they pass downwardly around cyclone 60. The surrounding vapor recovery shroud 417 then encircles vapor release shroud 66 and provides an intake through line 437 to vapor recovery cyclone 144.

The balance of FIG. 11 shows a typical vapor recovery distillation system, including a distillation column 402 for fractionation of the recovered hydrocarbon vapors and removal of foul water, produced by steam rising through stripper 64 and steam used to fluidize and transport the catalyst from the regenerator to the reactor pipe as well as steam injected with the hydrocarbon feed for better feed atomization and mixing. Such foul water recovery may be through a unit 401 in the overhead stream from fractionation unit 402.

In FIG. 12 the vapor recovery zone is formed by vapor recovery shroud 417, arranged to recover the hydrocarbon vapor released by cyclone 60, after primary disengagement of vapor from catalyst fines in chamber 431 formed by primary vapor shroud 465. In the same manner as in FIG. 11, entry of overhead vapor into vapor recovery shroud 417 is through a turn of substantially 180° for vapors discharged from the primary recovery shroud 465.

Reference is now made to experimental results illustrated in FIGS. 13 through 17. FIG. 13 is a diagramatic representation of the general arrangement of FIG. 1 wherein separator vessel 24, riser 10 and folded riser shroud 26 schematically represent the mode in which these experimental studies were made. The test results are shown in FIGS. 14 through 17 in which the actual weight of catalyst recovered with vapor in pounds/minute in the pilot plant are plotted against equivalent catalyst circulation rates which would be tons/minute in a commercial plant. The catalyst circulation rates were scaled up to those for a particular commercial plant, hence the term "equivalent catalyst circulation rate". All tests were made for a discharge rate of 30 feet per second from discharge zone 27. The measured values are plotted for points A through I, distributed as shown in FIG. 13.

FIG. 14, in particular, shows the effect not only of velocity inlet in feet/second of the vapor but also the cyclone intake position at the same level A, relative to the radial distance of the sampling point of discharge 27 from shroud 26. As indicated, the best result was obtained when vapor is sampled directly adjacent the discharge end 27 of shroud 26 as at $A_1$. As particularly shown in FIG. 14, this result prevails at both 100 feet/second inlet velocity and at 10 feet/second inlet velocity to the vapor recovery shroud. The worst case is clearly at sampling point $A_3$ near the wall, and the next worst case is at position $A_2$, which is half-way between shroud discharge 27 and the wall of vessel 24. The graph in FIG. 15 shows the results when the sampling points were taken essentially half-way between the wall of vessel 24 and the discharge of shroud 26. As there indicated, the position at $A_2$, the shroud bottom and half-way up shroud 26 is substantially the same. Between points $A_2$ and D, which includes point B at about 30 tons/minute or greater, cyclone loading becomes progressively worse, with the worst case being at $A_2$. The next worst is at B. While the measurements at E through I appear to be considerably better, in terms of reduced catalyst entrainment, they do represent longer flow paths that do result in undesirable secondary cracking. Further, they assume that such overhead distance is available within separator 24. This particular set of measurements indicates that if the height of the vessel is tall enough, then the space above the shroud, as indicated by the measurements 4, 8, 12, 16 and 20 feet above the top of the shroud, would reduce catalyst intake with the vapor. Such additional height is infrequently available and in general cannot be economically justified, as by retrofit, particularly since longer contact time of the catalyst particles with the hydrocarbon vapor produces secondary cracking.

FIG. 16 indicates the comparative results in recovery of vapor from directly adjacent the shroud as compared to withdrawal of vapor from one quarter of the distance down from the top of the shroud 26 as at $C_1$, or at the vessel wall at the same level, $C_2$, as compared to measurements made directly at the wall, $A_3$. It is clear from this graph that the sampling point nearer the shroud exit, so that vapor must make about a 180° turn to enter the sampling point, even at vapor flow rates of 100 feet/second, gives superior results to those that recover vapor from other points.

FIG. 17 illustrates the effect of catalyst circulation, at velocities of 10, 30, 60 and 100 feet/second into the vapor recovery shroud at sample point $A_1$, directly adjacent the shroud and at the same level as discharge 27 from shroud 26. As indicated, superior results are obtained at 100 feet per second to the vapor recovery shroud when the vapor recovery elevation is at the shroud discharge level.

Table I indicates the yield improvements of coke and gas fractions to gasoline and cycle oil fractions obtained in pilot plant runs mimicking commercial plants of the type shown in FIG. 1 with the intake to the vapor recovery cyclones located closer to the reactor tube outlet so as to minimize overcracking.

TABLE I

| FCC Pilot Plant Yield Shifts by Elimination of Dilute Phase Cracking at 965° F. Reactor Temperature | |
|---|---|
| | wt % change |
| Coke | −0.2 |

TABLE I-continued

FCC Pilot Plant Yield Shifts by
Elimination of Dilute Phase Cracking
at 965° F. Reactor Temperature

|  |  | wt % change |
|---|---|---|
| Gases | | |
| Total |  | −2.18 |
|  | $C_2-$ | −1.05 |
|  | $C_{3s} + C_{4s}$ | −1.13 |
| Gasolines | | |
| Total |  | +1.75 |
|  | $C_5 -265°$ F. | +.93 |
|  | 265°–430° F. | +.82 |
| Cycle Oils | | |
| Total |  | +.63 |
|  | 430°–625° F. | +.63 |
|  | 625°+F. | .00 |

While the changes shown in Tables I represent only a few percent change in upgraded products, the financial advantages of the present invention are indeed significant. At a feed rate of 54,800 barrels per day an improvement of 1% in gasoline at 25 cents/gal (assuming 25% of $1/gallon) represents a net gain of over $5,700/day. The noted results of 2 to 3% improvement would have a value of $11,500 to $17,200/day (approximately $4 to $6 million/year).

FIG. 18 illustrates the method of the present invention applied to a commercial installation of a large diameter FCC separator vessel. The arrangement, generally similar to FIG. 1, has been modified to increase the length of stripper section 532. As shown, riser pipe 510 is extended upwardly in vessel 524 and discharge shroud 526 has been shortened. Accordingly, concentric vapor recovery shroud 517 is suitably shortened which reduces the length of the vapor flow path to plenum 546 through intake 527 of cyclone 544 for transport of vapor to a distillation column by line 548. As indicated, catalyst disengaging baffle 528 is also elongated and made greater in diameter at its base 553.

The arrangement of FIG. 18 was simulated in model studies for comparison with two other forms of FCC vapor recovery proposed in U.S. Pat. No. 4,066,533—Myers et al and U.S. Pat. No. 4,435,279—Busch et al. These are respectively indicated schematically in FIGS. 19A, 19B and 19C. The arrangement of FIG. 19C indicates a system in which the hydrocarbon vapor and catalyst mixture is ballistically separated by discharge against the top of the vessel 721 with all vapor recovered through cyclones 744 whose intakes 737 are tapped into the side of riser 710. In FIG. 19B, the mixture is similarly directed against the top of vessel 821, but vapor is admitted to cyclones 844 through an upwardly directed opening 827 adjacent the discharge end of riser 810.

FIG. 20 illustrates graphically the improvement in catalyst loading on the cyclones by the arrangement of the present invention with catalyst discharging downwardly as indicated by curve A, for the system of FIGS. 18 and 19A. The lower rate of cyclone loading in pounds per minute is compared to curves B and C, respectively produced by the models of FIGS. 19B and 19C. To the extent feasible the same gas entry velocity was maintained for each of the three illustrated embodiments.

Various modifications and changes will occur to those skilled in the art from the foregoing detailed description of the apparatus and the methods of operating such apparatus. In particular, it will be apparent that in any FCC separation vessel the preferred zone in the vessel for minimum catalyst content of recovered vapors may be found by a few selected measurements. The inlet to the cyclones may then be disposed so that they are in said vapor recovery zone for minimum solids contamination of said vapor and the desired hydrocarbon products. Flow from said vapor recovery zone is arranged for rapid transport to a distillation column with minimum delay which limits secondary cracking of the vapor and thereby reduces gas make and gasoline loss.

The principles, preferred embodiments and modes of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the following claims be embraced thereby.

What is claimed is:

1. In an apparatus for fluidized catalytic cracking of hydrocarbons comprising a transfer reactor pipe means for circulating a heated mixture of catalyst particles and hydrocarbonaceous material for catalytic reaction of said hydrocarbons in said reactor pipe, means for discharging the output of said reactor pipe downwardly into a large diameter separator vessel, means for deflecting the downward flow of said mixture outwardly toward the walls of said vessel to separate reacted hydrocarbon vapors from spent catalyst in said separator vessel, stripping means for recovering residual hydrocarbon vapors from said spent catalyst passing from said separator vessel to a catalyst regenerator for recycling of regenerated catalyst to said reactor pipe and cyclone means within said separator vessel for recovering cracked hydrocarbon vapors for transfer to distillation means for recovery of hydrocarbon components therein; the improvement which comprises:

separate vapor recovery shroud means within said separator vessel and substantially smaller in cross-sectional area than said separator vessel to confine a central portion within the surrounding upper end of said separator vessel, said vapor recovery shroud means extending above and closely surrounding at least a portion of the external surface of the discharge portion of said reactor pipe, the vapor entry area into said vapor recovery shroud means from said vessel being disposed relative to the discharge level from said reactor pipe to require a substantial reversal of vapor to flow from said reactor pipe discharge into said vapor recovery shroud means;

means for connecting the vapor inlet to said cyclone means to the upper end of said vapor recovery shroud means; and means extending the dip leg means of said cyclone means downwardly in said vessel to a level below said discharge level of said reactor pipe.

2. Apparatus in accordance with claim 1 wherein the vapor entry level to said vapor recovery shroud means is adjacent to but not lower than said discharge level of said reactor pipe.

3. Apparatus in accordance with claim 1 wherein at least one stage of said cyclone means is enclosed within said vapor recovery shroud means.

4. Apparatus in accordance with claim 1 wherein the direction of entry of vapors into said cyclone means is substantially perpendicular to a longitudinal axis of said vapor recovery shroud means.

5. In an apparatus for fluidized catalytic cracking of hydrocarbons comprising transfer reactor pipe means for circulating a heated mixture of catalyst particles and hydrocarbonaceous material for catalytic cracking of said hydrocarbonaceous material in said reactor pipe, means for discharging the output of said reactor pipe downwardly into a large diameter generally cylindrical separator vessel wherein spent catalyst and hydrocarbon vapor are separated, stripping means for recovering residual hydrocarbon vapors from said spent catalyst, means for passing spent catalyst from the lower end of said separator vessel to a catalyst regenerator, a regenerator for regenerating and heating spent catalyst therein and means for recycling heated catalyst to said reactor pipe from said regenerator, and cyclone means within the upper end of said separator vessel for recovering cracked hydrocarbon vapors for transfer to distillation means and for separating cracked hydrocarbon components from catalyst particles therein, said cyclone means including dip leg means for returning catalyst particles to said stripping means;

the improvement comprising separate vapor recovery shroud means extending upwardly within said separator vessel and separately enclosing a portion of the upper end thereof from the surrounding vessel, said vapor recovery shroud means being substantially smaller in cross-sectional area than said separator vessel and extending upwardly external to, said reactor pipe, the vapor entry area into said shroud means being at a level not lower than the discharge end of said reactor pipe so as to require a substantial reversal for flow of vapor entering said vapor recovery shroud means from said vessel;

means for connecting the vapor inlet of said cyclone means to recover hydrocarbon vapors from said separator vessel solely through the upper end of said vapor recovery shroud means; and said dip leg means of said cyclone means extending downwardly to a level below said discharge level of said reactor pipe.

6. Apparatus in accordance with claim 5 wherein the improvement further comprises said vapor entry level to said vapor recovery shroud means being adjacent to but not lower than the discharge level of said reactor pipe means into said vessel.

7. Apparatus in accordance with claim 5 wherein the improvement further comprises at least one stage of said cyclone means being enclosed within said vapor recovery shroud means.

8. Apparatus in accordance with claim 5 wherein the improvement further comprises the direction of said vapor inlet into said cyclone means being substantially perpendicular to the axis of said vapor recovery shroud means.

9. Apparatus in accordance with claim 5 wherein the improvement further comprises said vapor recovery shroud means being at least partially closely surrounding said reactor pipe.

10. Apparatus in accordance with claim 5 wherein the improvement further comprises means for deflecting flow of the catalyst hydrocarbon mixture from said reactor pipe discharge end downwardly and outwardly toward the walls of said separator vessel to improve separation of reacted hydrocarbon vapors and spent catalyst in said separator vessel and the vapor inlet of said vapor recovery shroud means being at a level above said deflecting means.

11. In an apparatus for reducing catalyst loading to cyclone separators and reducing secondary cracking of hydrocarbon vapors in a fluid catalytic cracking system wherein hydrocarbonaceous material is reacted with heated catalyst particles in a riser reactor and the resulting mixture is separated in a large diameter separator vessel having a generally vertical central axis, with recovered catalyst being returned to a catalyst regenerator through stripper means at the lower end of said separator vessel and cracked hydrocarbon vapors being recovered overhead through one or more cyclone separator means disposed within said separator vessel wherein the improvement comprises means for discharging the reacted mixture of catalyst and hydrocarbon vapor downwardly from said riser reactor into said separator vessel, a vapor recovery shroud extending upwardly within said vessel and substantially parallel to said vessel axis to form a restricted volume for vapor within said vessel to enter said cyclone separators, and the inlet to said vapor recovery shroud being adjacent but not lower than the level of said discharge outlet into said vessel from said riser reactor whereby vapor entering said inlet from said vessel is substantially counterflow to said mixture discharge, and means for positioning the inlet of said cyclone separator means within the upper end of said vapor recovery shroud so that the vapor outlet of said separator vessel is solely through said vapor recovery shroud to reduce catalyst loading on said cyclone separator means and to reduce contact of hydrocarbon vapor and catalyst in said separator vessel with attendant undesirable secondary cracking of said vapor.

12. In an apparatus in accordance with claim 11 wherein said mixture is introduced by said reactor riser near said central axis of said generally cylindrical separator vessel and said apparatus includes baffle means in said separator vessel disposed adjacent the discharge outlet from said riser reactor to deflect said mixture outwardly substantially uniformly toward said vessel walls and said vapor recovery shroud inlet is concentric with said discharge outlet from said riser reactor.

* * * * *